(12) United States Patent
Wanibe

(10) Patent No.: US 11,225,918 B2
(45) Date of Patent: Jan. 18, 2022

(54) ENGINE DEVICE

(71) Applicant: TOYOTA JIDOSHA KABUSHIKI KAISHA, Aichi-ken (JP)

(72) Inventor: Masahiro Wanibe, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/096,974

(22) Filed: Nov. 13, 2020

(65) Prior Publication Data
US 2021/0189978 A1 Jun. 24, 2021

(30) Foreign Application Priority Data

Dec. 20, 2019 (JP) .............................. JP2019-229978

(51) Int. Cl.
*F02M 1/00* (2006.01)
*F02D 41/00* (2006.01)
*F02M 25/08* (2006.01)

(52) U.S. Cl.
CPC ..... *F02D 41/0002* (2013.01); *F02D 41/0045* (2013.01); *F02M 25/08* (2013.01)

(58) Field of Classification Search
CPC ............ F02D 41/0032; F02D 41/2422; F02D 41/0045; F02D 2200/0406; F01D 41/004
See application file for complete search history.

(56) References Cited

U.S. PATENT DOCUMENTS

| | | | | |
|---|---|---|---|---|
| 10,480,430 | B2 * | 11/2019 | Tsutsumi | F02M 35/1038 |
| 2014/0020664 | A1 * | 1/2014 | Yoshioka | F02D 11/10 |
| | | | | 123/559.1 |
| 2016/0273493 | A1 * | 9/2016 | Ono | F02M 25/0809 |
| 2018/0163646 | A1 | 6/2018 | Tsutsumi et al. | |
| 2018/0171901 | A1 * | 6/2018 | Omichi | F02M 25/0818 |
| 2018/0238273 | A1 * | 8/2018 | Maegawa | F02D 41/22 |
| 2018/0291830 | A1 * | 10/2018 | Kurosawa | F01M 13/022 |
| 2019/0345885 | A1 * | 11/2019 | Asanuma | F02M 25/0836 |
| 2020/0063670 | A1 * | 2/2020 | Asanuma | F02D 41/12 |
| 2020/0217262 | A1 * | 7/2020 | Yoshioka | F02D 43/00 |
| 2020/0224611 | A1 * | 7/2020 | Honda | F02M 25/089 |
| 2020/0256286 | A1 * | 8/2020 | Asanuma | F02M 25/0836 |
| 2020/0347805 | A1 * | 11/2020 | Oh | F02D 41/003 |
| 2021/0071598 | A1 * | 3/2021 | Nakagawa | B01D 53/0446 |
| 2021/0131906 | A1 * | 5/2021 | Yukawa | G01R 21/00 |

FOREIGN PATENT DOCUMENTS

JP 201896247 A 6/2018

* cited by examiner

*Primary Examiner* — John Kwon
(74) *Attorney, Agent, or Firm* — Hautpman Ham, LLP

(57) ABSTRACT

An engine device is equipped with an engine that is supplied with fuel from a fuel tank and that has a throttle valve arranged in an intake pipe, a supercharger that has a compressor arranged in the intake pipe, and an evaporative fuel treatment device that has a supply pipe for supplying evaporative fuel gas containing evaporative fuel generated in the fuel tank to the intake pipe in a region upstream of the compressor, and a purge valve provided in the supply pipe. Moreover, the throttle valve is controlled such that an opening degree of the throttle valve becomes larger when upstream purge for supplying evaporative fuel gas to the intake pipe via the supply pipe is carried out than when upstream purge is not carried out, while the supercharger is in operation.

3 Claims, 3 Drawing Sheets

ENGINE DEVICE

CROSS-REFERENCE TO RELATED APPLICATION

This application claims priority to Japanese Patent Application No. 2019-229978 filed on Dec. 20, 2019, incorporated herein by reference in its entirety.

BACKGROUND

1. Technical Field

The present disclosure relates to an engine device.

2. Description of Related Art

Conventionally, as this type of engine device, there has been proposed an engine device that is equipped with an engine that is supplied with fuel from a fuel tank and that has a throttle valve arranged in an intake pipe, a supercharger having a compressor arranged upstream of the throttle valve in the intake pipe, and an evaporative fuel treatment device that supplies the intake pipe with purge gas containing evaporative fuel generated in the fuel tank (e.g., see Japanese Unexamined Patent Application Publication No. 2018-96247 (JP 2018-96247 A)). It should be noted herein that the evaporative fuel treatment device is equipped with a canister that adsorbs the evaporative fuel generated in the fuel tank, a purge passage that connects the canister and an intake pipe to each other and through which purge gas delivered to the engine from the canister passes, a purge control valve that is provided in the purge passage, and an ejector that is attached in parallel to the supercharger. The purge passage branches off, downstream of the purge control valve, into a first branch passage and a second branch passage that are connected to the intake pipe at a point downstream of the throttle valve. An intake port of the ejector is connected to the intake pipe at a point between the supercharger (a compressor) and the throttle valve, an exhaust port of the ejector is connected to the intake pipe at a point upstream of the supercharger, and a suction port of the ejector is connected to the second branch passage.

SUMMARY

In the foregoing engine device, while the supercharger is in operation, the amount of air passing through the throttle valve at the same throttle opening degree is smaller by an amount of evaporative fuel contained in purge gas when upstream purge for supplying purge gas to the intake pipe in a region upstream of the supercharger via the ejector is carried out than when upstream purge is not carried out. Therefore, the amount of air passing through the throttle valve is assumed to be smaller than a required air amount corresponding to a required load factor of the engine.

It is a main object of an engine device according to the present disclosure to restrain the amount of air passing through a throttle valve from becoming smaller than a required air amount corresponding to a required load factor of an engine when upstream purge is carried out while a supercharger is in operation.

The engine device according to the present disclosure adopts the following means to achieve the foregoing main object.

The engine device according to the present disclosure is equipped with an engine that is supplied with fuel from a fuel tank and that has a throttle valve arranged in an intake pipe, a supercharger that has a compressor arranged in the intake pipe, an evaporative fuel treatment device that has a supply pipe for supplying evaporative fuel gas containing evaporative fuel generated in the fuel tank to the intake pipe in a region upstream of the compressor, and a purge valve provided in the supply pipe, and a control device. The control device controls the throttle valve such that an opening degree of the throttle valve becomes larger when upstream purge for supplying the evaporative fuel gas to the intake pipe via the supply pipe is carried out than when the upstream purge is not carried out, while the supercharger is in operation.

In the engine device according to the present disclosure, the throttle valve is controlled such that the opening degree of the throttle valve becomes larger when the upstream purge for supplying evaporative fuel gas to the intake pipe via the supply pipe is carried out than when the upstream purge is not carried out, while the supercharger is in operation. Thus, the amount of air passing through the throttle valve can be restrained from becoming smaller than the required air amount corresponding to the required load factor of the engine when the upstream purge is carried out while the supercharger is in operation.

In the engine device according to the present disclosure, the control device may set a target opening degree of the throttle valve such that the target opening degree increases from a basic opening degree of the throttle valve based on a required torque of the engine as a flow rate of the evaporative fuel increases, and control the throttle valve through the use of the target opening degree, when the upstream purge is carried out. In this manner, the target opening degree of the throttle valve can be more appropriately set.

In this case, the control device may estimate a flow rate of the evaporative fuel gas based on the opening degree of the valve, estimate a concentration of the evaporative fuel contained in the evaporative fuel gas based on an air-fuel ratio of the engine, and estimate a flow rate of the evaporative fuel based on the flow rate and the concentration of the evaporative fuel gas, when the upstream purge is carried out. In this manner, the flow rate of the evaporative fuel can be estimated.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Next, modes for carrying out the present disclosure will be described using embodiments thereof.

Figure 1:
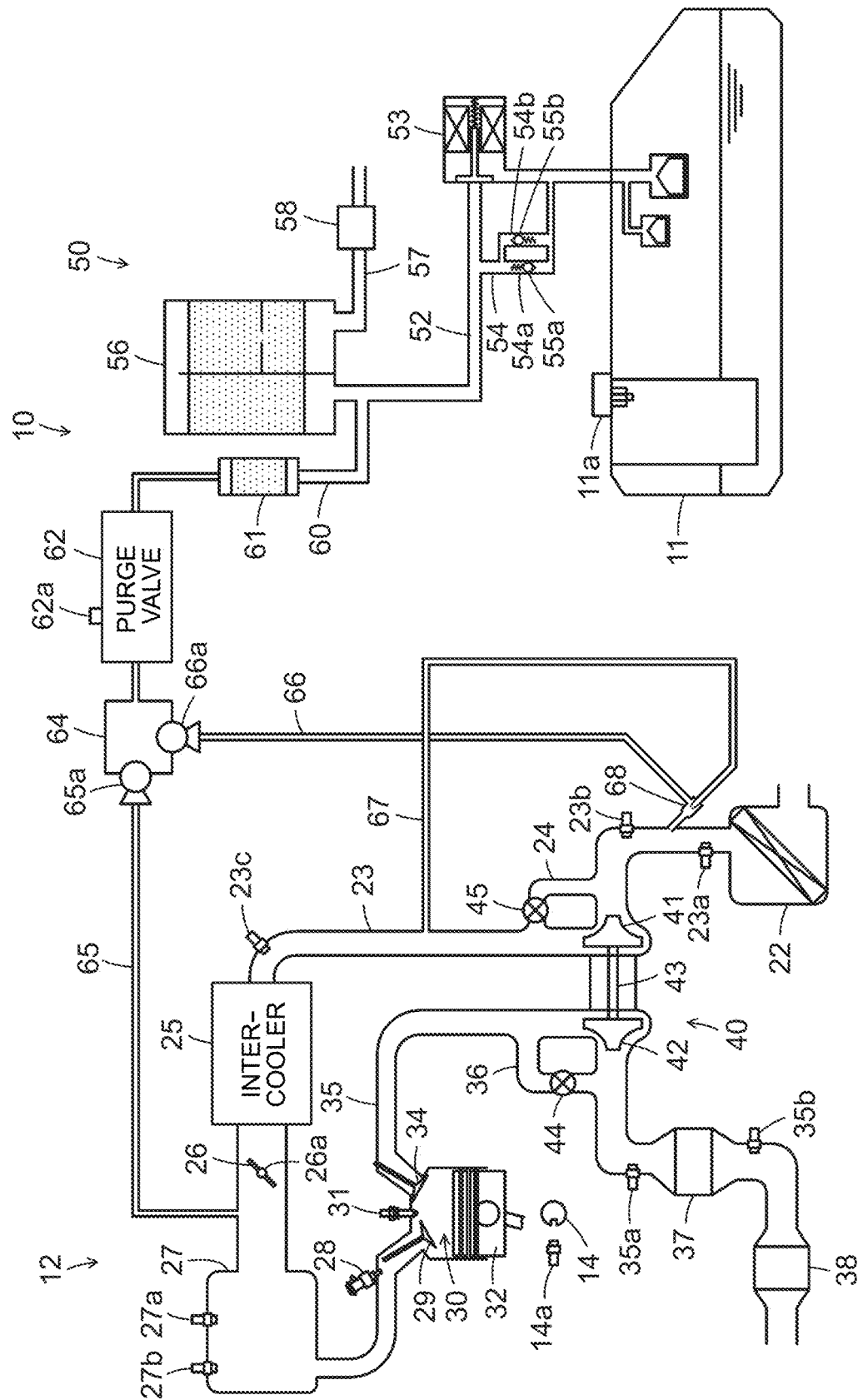
FIG. 1 is a block diagram showing the outline of the configuration of an engine device 10 according to one of the embodiments of the present disclosure.
Figure 2:
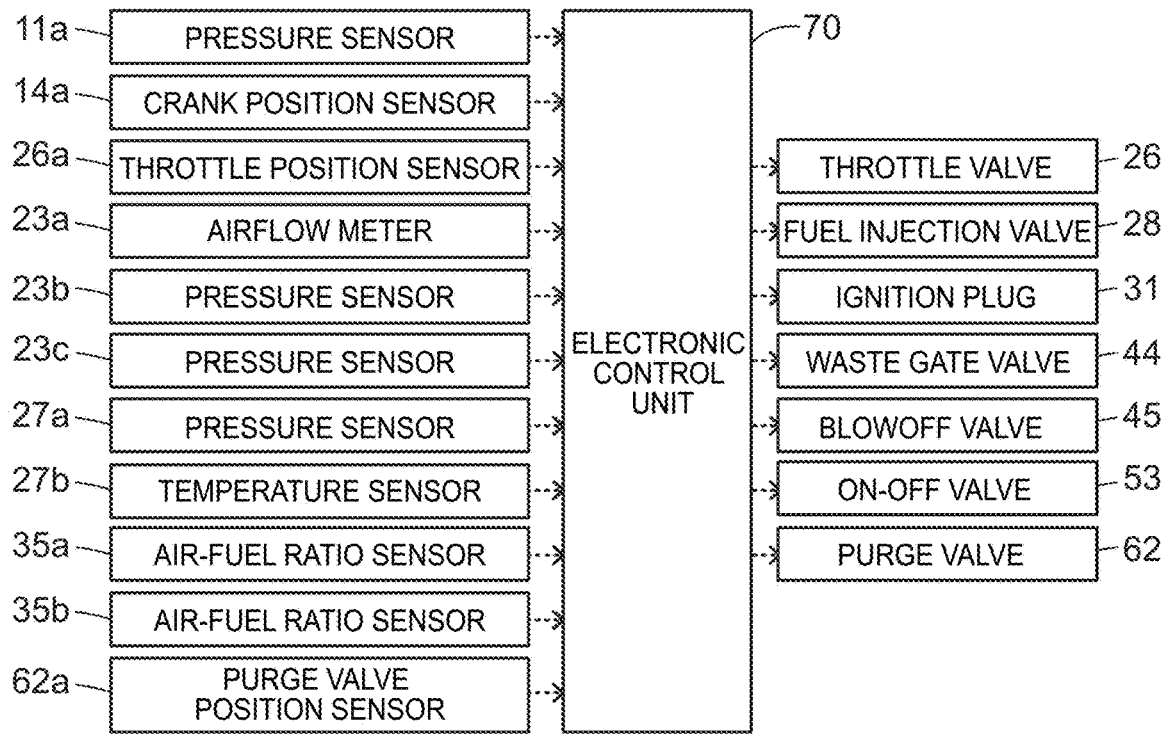
FIG. 2 is an illustrative view showing examples of signals input to and output from an electronic control unit 70.

FIG. 1 is a block diagram showing the outline of the configuration of an engine device 10 according to one of the embodiments of the present disclosure. FIG. 2 is an illustrative view showing examples of signals input to and output from an electronic control unit 70. The engine device 10 according to the embodiment is mounted in a common automobile or one of a variety of hybrid automobiles. As shown in FIGS. 1 and 2, the engine device 10 is equipped with an engine 12, a supercharger 40, an evaporative fuel treatment device 50, and the electronic control unit 70.

The engine 12 is configured as an internal combustion engine that outputs motive power through the use of fuel such as gasoline or light oil that is supplied from a fuel tank 11 via a feed pump (not shown) or a fuel passage (not shown). The engine 12 sucks the air cleaned by an air cleaner 22 into an intake pipe 23, causes the air to pass through an intercooler 25, a throttle valve 26, and a surge tank 27 in this sequence, injects fuel from a fuel injection valve 28 in the intake pipe 23 in a region downstream of the surge tank 27, and mixes the air and the fuel with each other. Then, the engine 12 sucks this air-fuel mixture into a combustion chamber 30 via an intake valve 29, and causes the air-fuel mixture to burn through explosion by an electric spark generated by an ignition plug 31. Then, the engine 12 converts reciprocating motion of a piston 32 depressed by the energy resulting from the burning through explosion into rotary motion of a crankshaft 14. Exhaust gas that is discharged from the combustion chamber 30 to an exhaust pipe 35 via an exhaust valve 34 is discharged to outside air via emission control devices 37 and 38 each having a catalyst (a three-way catalyst) that removes noxious components such as carbon monoxide (CO), hydrocarbons (HC), and nitrogen oxides (NOx).

The supercharger 40 is configured as a turbocharger, and is equipped with a compressor 41, a turbine 42, a rotary shaft 43, a waste gate valve 44, and a blowoff valve 45. The compressor 41 is arranged in the intake pipe 23 in a region upstream of the intercooler 25. The turbine 42 is arranged in the exhaust pipe 35 in a region upstream of the emission control device 37. The rotary shaft 43 couples the compressor 41 and the turbine 42 to each other. The waste gate valve 44 is provided in a bypass pipe 36 that establishes communication between a region of the exhaust pipe 35 located upstream of the turbine 42 and a region of the exhaust pipe 35 located downstream of the turbine 42, and is controlled by the electronic control unit 70. The blowoff valve 45 is provided in a bypass pipe 24 that establishes communication between a region of the intake pipe 23 located upstream of the compressor 41 and a region of the intake pipe 23 located downstream of the compressor 41, and is controlled by the electronic control unit 70.

The supercharger 40 adjusts the distribution ratio between an amount of exhaust gas flowing through the bypass pipe 36 and an amount of exhaust gas flowing through the turbine 42, adjusts the rotational driving force of the turbine 42, adjusts the amount of air compressed by the compressor 41, and adjusts the supercharging pressure (the intake pressure) of the engine 12, by adjusting the opening degree of the waste gate valve 44. It should be noted herein that the distribution ratio is more specifically adjusted such that the amount of exhaust gas flowing through the bypass pipe 36 decreases and the amount of exhaust gas flowing through the turbine 42 increases as the opening degree of the waste gate valve 44 decreases. Incidentally, when the waste gate valve 44 is fully open, the engine 12 can operate in the same manner as a natural intake-type engine that is not equipped with the supercharger 40.

Besides, the supercharger 40 can release a surplus pressure downstream of the compressor 41 by opening the blowoff valve 45 when the pressure in the intake pipe 23 in a region downstream of the compressor 41 is higher than the pressure in the intake pipe 23 in a region upstream of the compressor 41 by a certain level. Incidentally, the blowoff valve 45 may be configured as a check valve that opens when the pressure in the intake pipe 23 in the region downstream of the compressor 41 becomes higher than the pressure in the intake pipe 23 in the region upstream of the compressor 41 by a certain level, instead of a valve that is controlled by the electronic control unit 70.

The evaporative fuel treatment device 50 is equipped with an introduction passage 52, an on-off valve 53, a bypass passage 54, relief valves 55a and 55b, a canister 56, a purge passage 60, a buffer portion 61, a purge valve 62, branch passages 65 and 66, a recirculation passage 67, and an ejector 68.

The introduction passage 52 is connected to the fuel tank 11 and the canister 56. The on-off valve 53 is provided in the introduction passage 52, and is configured as a normally closed-type electromagnetic valve. The on-off valve 53 is controlled by the electronic control unit 70.

The bypass passage 54 is a bypass that directly connects a portion of the introduction passage 52 located between the fuel tank 11 and the on-off valve 53 to a portion of the introduction passage 52 located between the canister 56 and the on-off valve 53, and has two separate branch portions 54a and 54b that merge with each other. The relief valve 55a is provided in the branch portion 54a, is configured as a check valve, and opens when the pressure on the fuel tank 11 side becomes higher than the pressure on the canister 56 side by a certain level. The relief valve 55b is provided in the branch portion 54b, is configured as a check valve, and opens when the pressure on the canister 56 side becomes higher than the pressure on the fuel tank 11 side by a certain level.

The canister 56 is connected to the introduction passage 52, and is open to the atmosphere via an atmosphere opening passage 57. The interior of the canister 56 is filled with an adsorbent such as activated carbon that can adsorb evaporative fuel from the fuel tank 11. An air filter 58 is provided in the atmosphere opening passage 57.

The purge passage 60 is connected to the introduction passage 52 at a point close to the canister 56 and a branch point 64. A buffer portion 61 and a purge valve 62 are provided in the purge passage 60 in this sequence from the introduction passage 52 side. The interior of the buffer portion 61 is filled with an adsorbent such as activated carbon that can adsorb evaporative fuel from the fuel tank 11 and the canister 56. The purge valve 62 is configured as a normally closed-type electromagnetic valve. The purge valve 62 is controlled by the electronic control unit 70.

The branch passage 65 is connected to the branch point 64 and the intake pipe 23 at a point between the throttle valve 26 and the surge tank 27. A check valve 65a is provided in the branch passage 65 at a point close to the branch point 64. The check valve 65a permits evaporative fuel gas containing evaporative fuel to flow in a direction from the purge passage 60 (the branch point 64) side to the branch passage 65 (the intake pipe 23) side, and prohibits evaporative fuel gas from flowing in the opposite direction.

The branch passage 66 is connected to the branch point 64 and a suction port of the ejector 68. A check valve 66a is provided in the branch passage 66 at a point close to the branch point 64. The check valve 66a permits evaporative fuel gas to flow in a direction from the purge passage 60 (the branch point 64) side to the branch passage 66 (the ejector 68) side, and prohibits evaporative fuel gas from flowing in the opposite direction.

The recirculation passage 67 is connected to the intake pipe 23 at a point between the compressor 41 and the intercooler 25, and an intake port of the ejector 68. The ejector 68 is equipped with the intake port, the suction port, and an exhaust port. The intake port of the ejector 68 is connected to the recirculation passage 67, the suction port of the ejector 68 is connected to the branch passage 66, and the exhaust port of the ejector 68 is connected to the intake pipe 23 at a point upstream of the compressor 41. A tip portion of the intake port is formed in a tapered manner.

In the ejector 68, when the supercharger 40 is in operation (when the pressure in the intake pipe 23 in the region downstream of the compressor 41 is positive), a difference in pressure is created between the intake port and the exhaust port, and recirculated intake air (intake air that is recirculated from the intake pipe 23 in the region downstream of the compressor 41 via the recirculation passage 67) flows from the intake port toward the exhaust port. At this time, recirculated intake air is depressurized at the tip portion of the intake port, and a negative pressure is generated around the tip portion. Then, due to the negative pressure, evaporative fuel gas is sucked from the branch passage 66 via the suction port. This evaporative fuel gas is supplied, together with recirculated intake air at the negative pressure, to the intake pipe 23 in the region upstream of the compressor 41 via the exhaust port.

The electronic control unit 70 is configured as a microprocessor that is mainly constituted of a CPU, and is equipped with a ROM that stores a processing program, a RAM that temporarily stores data, input/output ports, and a communication port as well as the CPU. Signals from various sensors are input to the electronic control unit 70 via the input ports respectively.

As the signals that are input to the electronic control unit 70, it is possible to mention, for example, a pressure Pt from a pressure sensor 11a that detects a pressure in the fuel tank 11, a crank angle θcr from a crank position sensor 14a that detects a rotational position of the crankshaft 14 of the engine 12, a coolant temperature Tw from a coolant temperature sensor (not shown) that detects a temperature of coolant in the engine 12, and a throttle opening degree TH from a throttle position sensor 26a that detects an opening degree of the throttle valve 26. It is also possible to mention a cam position θca from a cam position sensor (not shown) that detects a rotational position of an intake camshaft that opens/closes the intake valve 29 and a rotational position of an exhaust camshaft that opens/closes the exhaust valve 34. It is also possible to mention an intake air amount Qa from an airflow meter 23a attached to the intake pipe 23 at a point upstream of the compressor 41, an intake air pressure Pin from a pressure sensor 23b attached to the intake pipe 23 at a point upstream of the compressor 41, and a supercharging pressure Pc from a pressure sensor 23c attached to the intake pipe 23 at a point between the compressor 41 and the intercooler 25. It is also possible to mention a surge pressure Ps from a pressure sensor 27a attached to the surge tank 27, and a surge temperature Ts from a temperature sensor 27b attached to the surge tank 27. It is also possible to mention a front air-fuel ratio AF1 from a front air-fuel ratio sensor 35a attached to the exhaust pipe 35 at a point upstream of the emission control device 37, and a rear air-fuel ratio AF2 from a rear air-fuel ratio sensor 35b attached to the exhaust pipe 35 at a point between the emission control device 37 and the emission control device 38. It is also possible to mention an opening degree Opg of the purge valve 62 from a purge valve position sensor 62a.

Various control signals are output from the electronic control unit 70 via the output ports respectively. As the signals that are output from the electronic control unit 70, it is possible to mention, for example, a control signal to the throttle valve 26, a control signal to the fuel injection valve 28, and a control signal to the ignition plug 31. It is also possible to mention a control signal to the waste gate valve 44, a control signal to the blowoff valve 45, a control signal to the on-off valve 53, and a control signal to the purge valve 62.

The electronic control unit 70 computes a rotational speed Ne of the engine 12 based on the crank angle θcr from the crank position sensor 14a. Besides, the electronic control unit 70 computes a load factor (a ratio of a volume of air that is actually sucked on one cycle to a cylinder capacity of the engine 12 on one cycle) KL based on the intake air amount Qa from the airflow meter 23a and the rotational speed Ne of the engine 12.

In the engine device 10 according to the embodiment thus configured, the electronic control unit 70 performs intake air amount control for controlling the opening degree of the throttle valve 26, fuel injection control for controlling the amount of fuel injected from the fuel injection valve 28, ignition control for controlling the ignition timing of the ignition plug 31, supercharging control for controlling the opening degree of the waste gate valve 44, and the like, based on a required load factor KL* of the engine 12.

The details of intake air amount control will be described later. Fuel injection control is performed by, for example, setting a target fuel injection amount Qf* of the fuel injection valve 28 based on the intake air amount Qa such that the front air-fuel ratio AF1 becomes equal to a target air-fuel ratio AF* (e.g., a theoretical air-fuel ratio), and controlling the fuel injection valve 28 through the use of the set target fuel injection amount Qf*. Ignition control is performed by, for example, setting a target ignition timing Tf* of the ignition plug 31 based on the rotational speed Ne and the required load factor KL* of the engine 12, and controlling the ignition plug 31 through the use of the set target ignition timing Tf*. Supercharging control is performed by, for example, setting a target opening degree Owv* of the waste gate valve 44 based on the rotational speed Ne and the required load factor KL* of the engine 12, and controlling the waste gate valve 44 through the use of the set target opening degree Owv*. Incidentally, as described above, the engine 12 operates in the same manner as the natural intake-type engine that is not equipped with the supercharger 40, when the waste gate valve 44 is fully open.

Besides, in the engine device 10 according to the embodiment, the surge pressure Ps is a negative pressure when the engine 12 is in operation without operating the supercharger 40. Therefore, when the on-off valve 53 and the purge valve 62 are opened by the electronic control unit 70, the check valve 65a is opened, and the evaporative fuel gas generated in the fuel tank 11 and the evaporative fuel gas desorbed from the canister 56 are supplied to the intake pipe 23 in a region downstream of the throttle valve 26 via the introduction passage 52, the purge passage 60, and the branch passage 65. The act of supplying evaporative fuel gas to the intake pipe 23 in the region downstream of the throttle valve 26 will be referred to hereinafter as "downstream purge", and a flow rate and a concentration of evaporative fuel gas (a ratio of evaporative fuel contained in evaporative fuel gas) at the time when downstream purge is carried out will be referred to hereinafter as "a downstream purge flow rate Qpgd" and "a downstream vapor concentration Cpgd" respectively. The downstream purge flow rate Qpgd is adjusted by adjusting the opening degree of the purge valve 62. Incidentally, when the supercharger 40 is out of operation, the check valve 66a is closed without operating the ejector 68.

When the engine 12 is operated while the supercharger 40 is in operation, the surge pressure Ps is a positive pressure. Therefore, the check valve 65a is basically closed. Besides, when the on-off valve 53 and the purge valve 62 are opened by the electronic control unit 70, the check valve 66a is opened through the operation of the ejector 68, and the evaporative fuel gas generated in the fuel tank 11 and the evaporative fuel gas desorbed from the canister 56 are supplied to the intake pipe 23 in the region upstream of the compressor 41 via the introduction passage 52, the purge passage 60, the branch passage 66, and the ejector 68. The act of supplying evaporative fuel gas to the intake pipe 23 in the region upstream of the compressor 41 will be referred to hereinafter as "upstream purge", and a flow rate and a concentration of evaporative fuel gas at the time when upstream purge is carried out will be referred to hereinafter as "an upstream purge flow rate Qpgu" and "an upstream vapor concentration Cpgu" respectively. The upstream purge flow rate Qpgu is adjusted by adjusting the opening degree of the purge valve 62.

Figure 3:
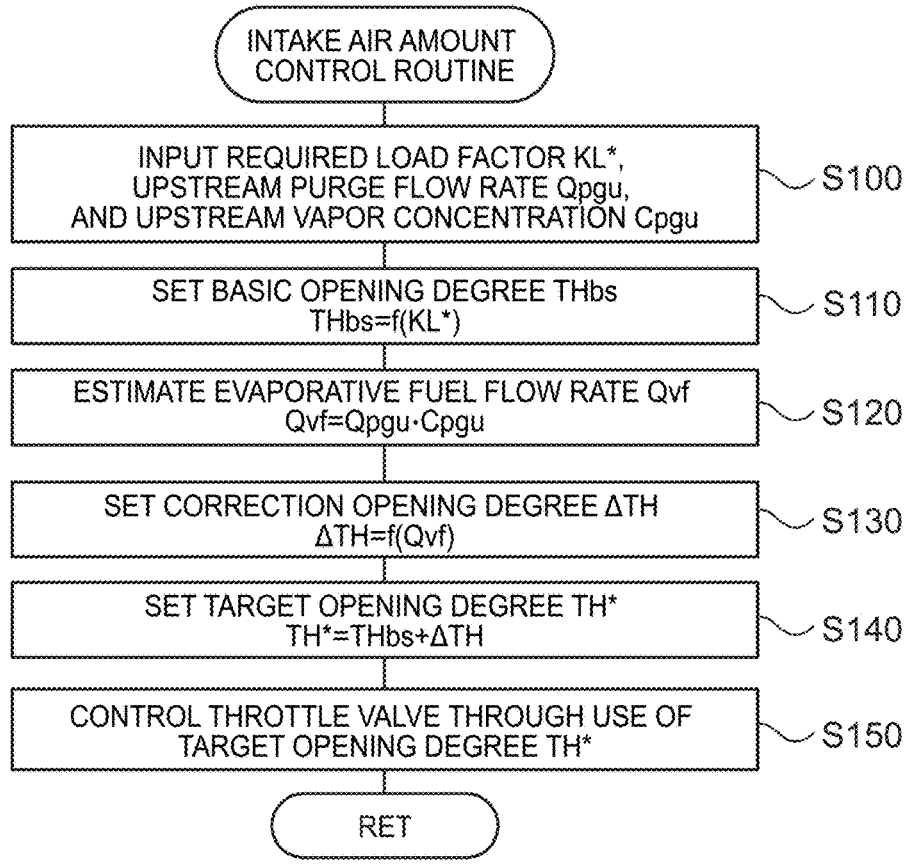
FIG. 3 is a flowchart showing an example of an intake air amount control routine that is carried out by the electronic control unit 70.

Next, the operation of the engine device 10 according to the embodiment thus configured, especially intake air amount control of the engine 12 will be described. FIG. 3 is a flowchart showing an example of an intake air amount control routine that is carried out by the electronic control unit 70. This routine is repeatedly carried out.

When the intake air amount control routine of FIG. 3 is carried out, data on the required load factor KL*, the upstream purge flow rate Qpgu, the upstream vapor concentration Cpgu, and the like are first input to the electronic control unit 70 (step S100). It should be noted herein that a value estimated based on the opening degree Opg of the purge valve 62 from the purge valve position sensor 62a is input as the upstream purge flow rate Qpgu. A value estimated based on an amount of deviation from the target air-fuel ratio AF* of the front air-fuel ratio AF1 from the front air-fuel ratio sensor 35a is input as the upstream vapor concentration Cpgu. Incidentally, when the opening degree Opg of the purge valve 62 is equal to 0, it is determined that upstream purge is not carried out, and 0 is set as the upstream purge flow rate Qpgu and the upstream vapor concentration Cpgu.

When the data are thus input to the electronic control unit 70, the electronic control unit 70 sets a basic opening degree THbs as a basic value of the target opening degree TH* of the throttle valve 26 based on the required load factor KL* (step S110). It should be noted herein that the basic opening degree THbs is set such that a required air amount corresponding to the required load factor KL* can be realized when upstream purge is not carried out (when the fluid passing through the throttle valve 26 does not contain evaporative fuel). In concrete terms, the basic opening degree THbs is set in such a manner as to increase as the required load factor KL* increases.

Subsequently, the electronic control unit 70 estimates a flow rate Qvf of evaporative fuel as a value obtained by multiplying the upstream purge flow rate Qpgu by the upstream vapor concentration Cpgu (step S120). Then, the electronic control unit 70 sets a correction opening degree ΔTH based on the estimated flow rate Qvf of evaporative fuel (step S130), sets a value obtained by adding the correction opening degree ΔTH to the basic opening degree THbs, as the target opening degree TH* of the throttle valve 26 (step S140), controls the throttle valve 26 through the use of the set target opening degree TH* (step S150), and ends the present routine. It should be noted herein that the correction opening degree ΔTH is set such that the required air amount corresponding to the required load factor KL* can be realized when upstream purge is carried out. In concrete terms, the correction opening degree ΔTH is set in such a manner as to increase as the flow rate Qvf of evaporative fuel increases.

It should be noted herein that when upstream purge is not carried out, the upstream purge flow rate Qpgu is equal to 0, 0 is set as the correction opening degree ΔTH, and the basic opening degree THbs is set as the target opening degree TH*. Thus, the target opening degree TH* is set such that the required air amount at the time when upstream purge is not carried out can be realized. Thus, even in an operating state where both the upstream purge flow rate Qpgu and the downstream purge flow rate Qpgd assume positive values (upstream purge and downstream purge are mixed together) as in the event of a changeover between upstream purge and downstream purge, an appropriate value is set as the target opening degree TH* without regard to the changeover between upstream purge and downstream purge.

While the supercharger 40 is in operation, the amount of air passing through the throttle valve 26 at the same throttle opening degree TH is smaller by an amount of evaporative fuel contained in evaporative fuel gas when upstream purge is carried out than when upstream purge is not carried out. Therefore, when the throttle valve 26 is controlled with the basic opening degree THbs based on the required load factor KL* set as the target opening degree TH*, the amount of air passing through the throttle valve 26 is predicted to be smaller than the required air amount corresponding to the required load factor KL*. In contrast, according to the embodiment, the throttle valve 26 is controlled with the value obtained by adding the correction opening degree ΔTH based on the flow rate Qvf of evaporative fuel to the basic opening degree THbs set as the target opening degree TH*. Therefore, the amount of air passing through the throttle valve 26 can be restrained from becoming smaller than the required air amount.

In the engine device 10 according to the embodiment described above, while the supercharger 40 is in operation, the throttle valve 26 is controlled such that the throttle opening degree TH becomes larger when upstream purge is carried out than when upstream purge is not carried out. Thus, the amount of air passing through the throttle valve 26 can be restrained from becoming smaller than the required air amount.

In the engine device 10 according to the embodiment, when upstream purge is carried out while the supercharger 40 is in operation, the correction opening degree ΔTH is set based on the flow rate Qvf of evaporative fuel, and the value obtained by adding the correction opening degree ΔTH to the basic opening degree THbs is set as the target opening degree TH* of the throttle valve 26. However, a constant value may be used as the correction opening degree ΔTH. In this case, with a view to restraining the amount of air passing through the throttle valve 26 from becoming excessively larger than the required air amount, a comparatively small constant value is preferably used as the correction opening degree ΔTH.

In the engine device 10 according to the embodiment, when upstream purge is carried out while the supercharger 40 is in operation, the flow rate Qvf of evaporative fuel is estimated as the product of the upstream purge flow rate Qpgu based on the opening degree Opg of the purge valve 62 and the upstream vapor concentration Cpgu based on the amount of deviation from the target air-fuel ratio AF* of the front air-fuel ratio AF1 from the front air-fuel ratio sensor 35a. However, the flow rate Qvf of evaporative fuel may be directly estimated based on the opening degree Opg of the purge valve 62 and the amount of deviation from the target air-fuel ratio AF* of the front air-fuel ratio AF1, without estimating the upstream purge flow rate Qpgu and the upstream vapor concentration Cpgu.

Figure 4:
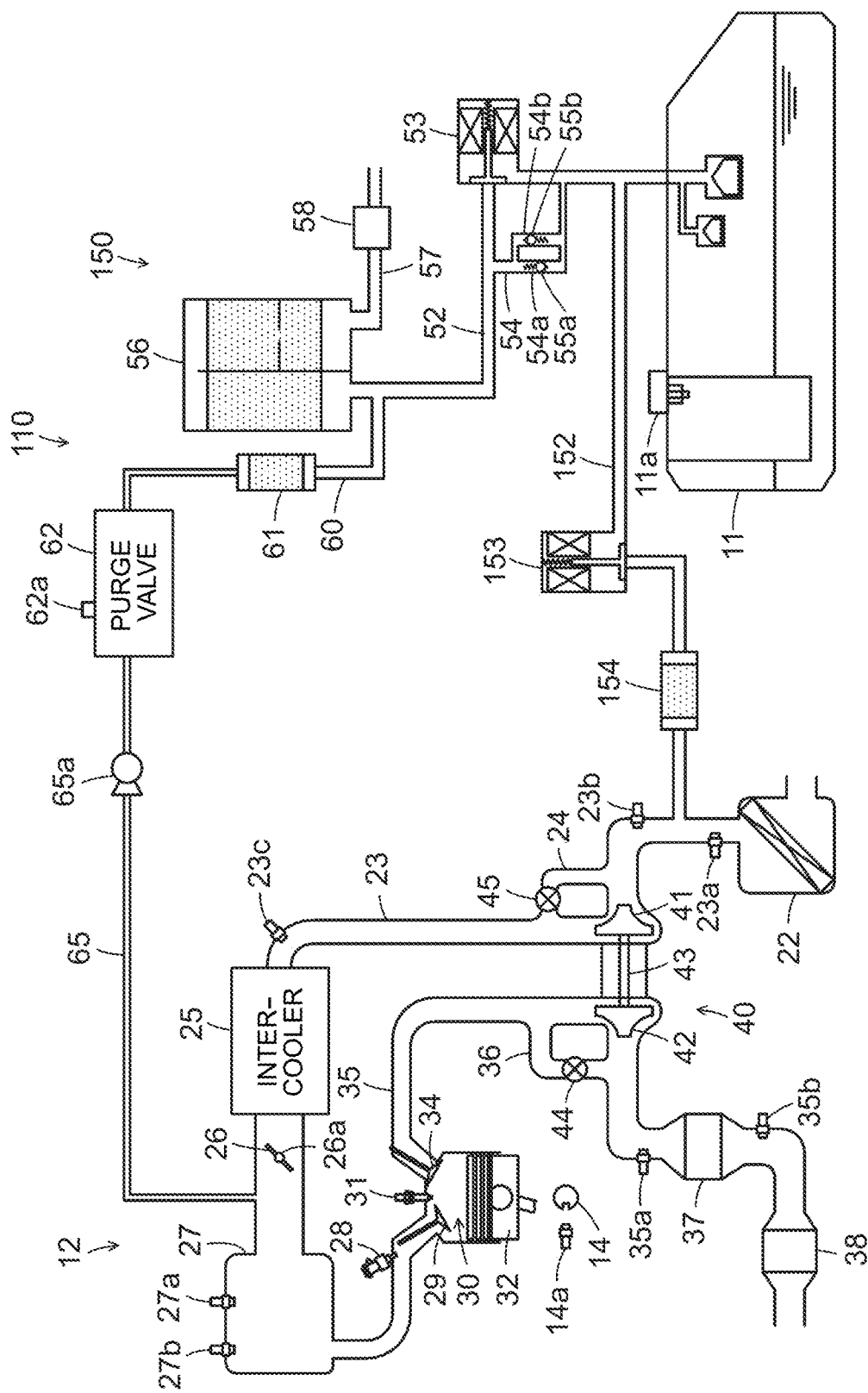
FIG. 4 is a block diagram showing the outline of the configuration of an engine device 110 according to a modification example.

The engine device 10 according to the embodiment is equipped with the evaporative fuel treatment device 50 shown in FIG. 1. However, as shown in FIG. 4, an engine device 110 according to a modification example may be equipped with an evaporative fuel treatment device 150. The evaporative fuel treatment device 150 of FIG. 4 is different from the evaporative fuel treatment device 50 of FIG. 1 in having a purge passage 152, an on-off valve 153, and a buffer portion 154 instead of the branch passage 66, the check valve 66a, the recirculation passage 67, and the ejector 68.

In the evaporative fuel treatment device 150, the purge passage 152 is connected to the introduction passage 52 and the intake pipe 23 at the point upstream of the compressor 41. The on-off valve 153 is provided in the purge passage 152, and is configured as a normally closed-type electromagnetic valve. The on-off valve 153 is controlled by the electronic control unit 70. The buffer portion 154 is provided in the purge passage 152. The interior of the buffer portion 154 is filled with an adsorbent such as activated carbon that can adsorb evaporative fuel from the fuel tank 11.

In the evaporative fuel treatment device 150, when the engine 12 is operated while the supercharger 40 is in operation, the evaporative fuel gas generated in the fuel tank 11 is supplied to the intake pipe 23 in the region upstream of the compressor 41 via the purge passage 152 (upstream purge is carried out) as soon as the on-off valve 53 and the purge valve 62 are closed and the on-off valve 153 is opened by the electronic control unit 70.

In the engine device 110 that is equipped with the evaporative fuel treatment device 50 according to the modification example thus configured as well as the engine device 10 according to the embodiment, the throttle valve 26 is controlled such that the throttle opening degree TH becomes larger when upstream purge is carried out than when upstream purge is not carried out, while the supercharger 40 is in operation. In concrete terms, when upstream purge is carried out while the supercharger 40 is in operation, the value obtained by adding the correction opening degree ΔTH based on the flow rate Qvf of evaporative fuel to the basic opening degree THbs is set as the target opening degree TH* of the throttle valve 26, and the throttle valve 26 is controlled through the use of the set target opening degree TH*. Thus, an effect similar to that of the embodiment can be exerted.

In the engine device 10 or 110 according to the embodiment or the modification example, the purge passage 60 is connected to the introduction passage 52 at the point close to the canister 56 in the evaporative fuel treatment device 50 or 150. However, the purge passage 60 may be connected to the canister 56.

In the engine device 10 according to the embodiment, the supercharger 40 is configured as a turbocharger having the rotary shaft 43 via which the compressor 41 arranged in the intake pipe 23 and the turbine 42 arranged in the exhaust pipe 35 are coupled to each other. Instead of this turbocharger, however, the supercharger 40 may be configured as a supercharger having a compressor that is arranged in the intake pipe 23 and that is driven by the engine 12 and a motor.

In the embodiment, the engine device 10 is configured to be mounted in a common automobile or one of a variety of types of hybrid automobiles. However, the engine device 10 may be configured to be mounted in a vehicle other than the automobiles, or mounted in an immobile facility such as a construction facility.

A corresponding relationship between the main elements of the embodiment and the main elements of the present disclosure mentioned in the section of means for solving the problem will be described. In the embodiment, the engine 12 is equivalent to "the engine", the supercharger 40 is equivalent to "the supercharger", the evaporative fuel treatment device 50 is equivalent to "the evaporative fuel treatment device", and the electronic control unit 70 is equivalent to "the control device".

Incidentally, the corresponding relationship between the main elements of the embodiment and the main elements of the present disclosure mentioned in the section of means for solving the problem is an example for concretely explaining the modes for carrying out the present disclosure mentioned in the section of means for solving the problem, and hence is not intended to limit the elements of the applicable embodiment mentioned in the section of means for solving the problem. That is, the present disclosure described in the section of means for solving the problem should be construed based on what is described in that section, and the embodiment is nothing more than a concrete example of the present disclosure described in the section of means for solving the problem.

Although the modes for carrying out the present disclosure have been described through the use of the embodiment, but it is obvious that the applicable embodiment should not be limited to the embodiment at all, and can be carried out in various forms within such a range as not to depart from the gist of the present disclosure.

The present disclosure is applicable to an industry for manufacturing engine devices, and the like.

What is claimed is:

1. An engine device comprising:
    an engine that is supplied with fuel from a fuel tank and that has a throttle valve arranged in an intake pipe;
    a supercharger that has a compressor arranged in the intake pipe;
    an evaporative fuel treatment device that has a supply pipe for supplying evaporative fuel gas containing evaporative fuel generated in the fuel tank to the intake pipe in a region upstream of the compressor, and a purge valve provided in the supply pipe; and
    a control device, wherein
    the control device controls the throttle valve such that an opening degree of the throttle valve becomes larger when upstream purge for supplying the evaporative fuel gas to the intake pipe via the supply pipe is carried out than when the upstream purge is not carried out, while the supercharger is in operation.

2. The engine device according to claim 1, wherein
    the control device sets a target opening degree of the throttle valve such that the target opening degree increases from a basic opening degree of the throttle valve based on a required torque of the engine as a flow rate of the evaporative fuel increases, and controls the throttle valve through use of the target opening degree, when the upstream purge is carried out.

3. The engine device according to claim 2, wherein
the control device estimates a flow rate of the evaporative fuel gas based on the opening degree of the purge valve, estimates a concentration of the evaporative fuel contained in the evaporative fuel gas based on an air-fuel ratio of the engine, and estimates a flow rate of the evaporative fuel based on the flow rate and the concentration of the evaporative fuel gas, when the upstream purge is carried out.

* * * * *